(12) United States Patent
Monti

(10) Patent No.: US 7,861,848 B2
(45) Date of Patent: Jan. 4, 2011

(54) SUPPLY STATION OF ARTICLES TO A PLURALITY OF CHANNELS OPENING ABOVE A CONTINUOUS BLISTER STRIP

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 457 days.

(21) Appl. No.: 11/972,292

(22) Filed: Jan. 10, 2008

(65) Prior Publication Data

US 2008/0179166 A1   Jul. 31, 2008

(30) Foreign Application Priority Data

Jan. 25, 2007   (IT) .......................... B02007A0043

(51) Int. Cl.
*B65G 47/12* (2006.01)

(52) U.S. Cl. ................. 198/443; 198/444; 209/240; 209/309

(58) Field of Classification Search ............. 198/443, 198/444, 445, 446, 447; 209/240, 244, 309
See application file for complete search history.

(56) References Cited

U.S. PATENT DOCUMENTS

| | | | | |
|---|---|---|---|---|
| 3,011,678 | A | * | 12/1961 | McClosky et al. ............ 221/10 |
| 3,622,039 | A | * | 11/1971 | Lindstrom .................... 221/10 |
| 5,027,938 | A | * | 7/1991 | Haggarty et al. ............. 198/358 |
| 5,052,167 | A | * | 10/1991 | Scharch ........................ 53/444 |

(Continued)

FOREIGN PATENT DOCUMENTS

EP   1547946 A   6/2005

(Continued)

OTHER PUBLICATIONS

International Search Report.

*Primary Examiner*—Douglas A Hess
(74) *Attorney, Agent, or Firm*—William J. Sapone; Coleman Sudol Sapone P.C.

(57) ABSTRACT

A supply station of articles to a plurality of channels opening above a continuous blister strip, of a type comprising supply organs for containing the articles and for dispensing the articles towards conveying means located downstream, which conveying means select and direct the articles in an ordered fashion in an advancement direction towards mouths afforded in the plurality of channels; collection and transfer means, functionally associated to the mouths and receiving and collecting excess articles which accumulate at the mouths, and transferring the excess articles upstream of the mouths, in proximity of a predetermined first zone of the conveying means. In particular the station comprises: directing organs interposed between the supply organs and the conveying organs to release the articles on the conveying organs, in proximity of the first zone; detecting and control organs for detecting a presence or absence of articles and/or excess articles on at least a second zone of the conveying means adjacent to the first zone and for at least temporarily inhibiting the directing organs with a consequent at least temporary interruption of release of the articles by the directing organs in relation to a quantity of articles and/or excess articles present in the second zone, in order to prevent an excess of the articles on the conveying means.

11 Claims, 3 Drawing Sheets

U.S. PATENT DOCUMENTS

| | | | |
|---|---|---|---|
| 5,236,077 A * | 8/1993 | Hoppmann et al. | 198/380 |
| 5,463,839 A * | 11/1995 | Stange et al. | 53/54 |
| 5,519,981 A * | 5/1996 | Fukusaki | 53/370 |
| 6,568,151 B2 * | 5/2003 | Buckley et al. | 53/240 |
| 6,631,799 B2 * | 10/2003 | Samson | 198/771 |
| 6,736,269 B2 * | 5/2004 | Monti | 209/240 |
| 6,799,413 B2 * | 10/2004 | Aylward | 53/473 |
| 7,222,717 B2 * | 5/2007 | Monti | 198/445 |

FOREIGN PATENT DOCUMENTS

| | | |
|---|---|---|
| GB | 1495686 A | 12/1977 |

* cited by examiner

SUPPLY STATION OF ARTICLES TO A PLURALITY OF CHANNELS OPENING ABOVE A CONTINUOUS BLISTER STRIP

BACKGROUND OF THE INVENTION

The invention concerns the technical sector relating to article transfer devices, where the articles originate from a relative storehouse, at the mouths of supply channels of continuous blister strips.

In the specific case the present invention concerns a supply station for articles to a plurality of channels opening above a continuous blister strip.

The prior art comprises devices for article transfer, for example pills, capsules, lozenges and the like, originating from a collection storehouse. These devices are usually provided with a hopper, situated downstream of the storehouse, which directs the articles onto an underlying transfer device (usually a vibrating linear conveyor) which sorts and directs the articles towards the mouths of the channels which supply the underlying continuous blister strip.

The supply methods to the continuous blister strips by the relative channels are realized in known ways, and determine a predetermined extra number of articles at the mouths. During the functioning of the conveyors, this extra number can become excessive and for this reason the conveyors advantageously include (as described in documents EP 1,325,877, corresponding to U.S. Pat. No. 6,736,269 and EP 1,547,946, corresponding to U.S. Pat. No. 7,222,717, belonging to the same applicant) means for collecting up the excess articles and returning them upstream, on the vibrating conveyor, usually to the exit of the hopper where a special guide is provided to cause the articles to flow laterally into the main flow of the articles originating from the hopper.

The above operating modes exhibit the drawback of determining a sort of "stagnation" of the articles coming from the collecting line, at the zone of re-flow of the collected articles into the flow of the articles coming from the hopper; this occurs both due to the fact that the main flow is considerably superior to that of the articles coming from the collection line, and due to the fact that, as mentioned, the re-collected articles are laterally re-introduced into the main flow. The articles coming from the collection line are therefore forced to wait a long time before being re-introduced into the main flow.

To this can be added that during this wait the articles coming from the collecting line are subjected to the action of the vibrating conveyor and can therefore impact against one another and be broken up, rendering them unsuitable for being directed towards the supply channels of the continuous blister strips.

SUMMARY OF THE INVENTION

The aim of the present invention is to provide a supply station for articles to a plurality of channels opening above a continuous blister strip, which obviates the above-mentioned drawbacks and which guarantees an optimal confluence between the flow of the articles originating from the re-collection line and the flow of articles coming from the storehouse.

A further aim of the present invention consists in providing a station which enables the articles coming from the storehouse and the articles coming from the collecting line to flow together easily, preventing an accumulation of the articles at the confluence zone of the two.

An additional aim of the present invention consists in providing a station which guarantees high standards of reliability and productivity under all functioning conditions.

To this is added the intention of providing a station that is simply-conceived, extremely functional and reliable, relatively inexpensive and which is easily installable and rapid and simple to maintain.

In the present invention these aims are attained by a supply station for articles to a plurality of channels opening above a continuous blister strip, the station being of a type comprising supply organs for containing the articles and for dispensing them towards downstream conveying means for selecting the articles and directing them in an ordered way, in an advancement direction, at the mouths afforded by the channels; means for collecting and transferring, functionally associated to the mouths, for receiving and collecting the articles in excess which accumulate at the mouths and transferring the articles upstream of the mouths, in proximity of a predetermined first zone of the conveying means. The station is characterized in that it comprises: directing organs interposed between the supply organs and the conveying means in order to release the articles onto the conveying means in proximity of the first zone; detecting and control organs for detecting the presence or absence of articles in at least a second zone of the conveying means adjacent to the first zone and for temporarily inhibiting the directing organs, with a consequent temporary interruption of the releasing of the articles by the directing organs, according to the quantity of articles present in the second zone, in order to prevent an excess of the articles on the conveying means.

The presence of the detecting and control organs means that the articles collected by the collecting and transfer means have prioritized release onto the conveying means. This mode of operation signifies that the articles are not allowed to remain in waiting (and therefore accumulate) at the zone of re-introduction onto the conveying means. This consequently prevents the articles from being subjected to impacts and breaking, which would make them unsuitable for being directed towards the supply channels.

BRIEF DESCRIPTION OF THE DRAWINGS

The characteristics of the invention will be more fully described in the following, in which some preferred but non-exclusive embodiments of the invention are illustrated with reference to the accompanying figures of the drawings, in which.

DESCRIPTION OF THE PREFERRED EMBODIMENTS

Figure 1:
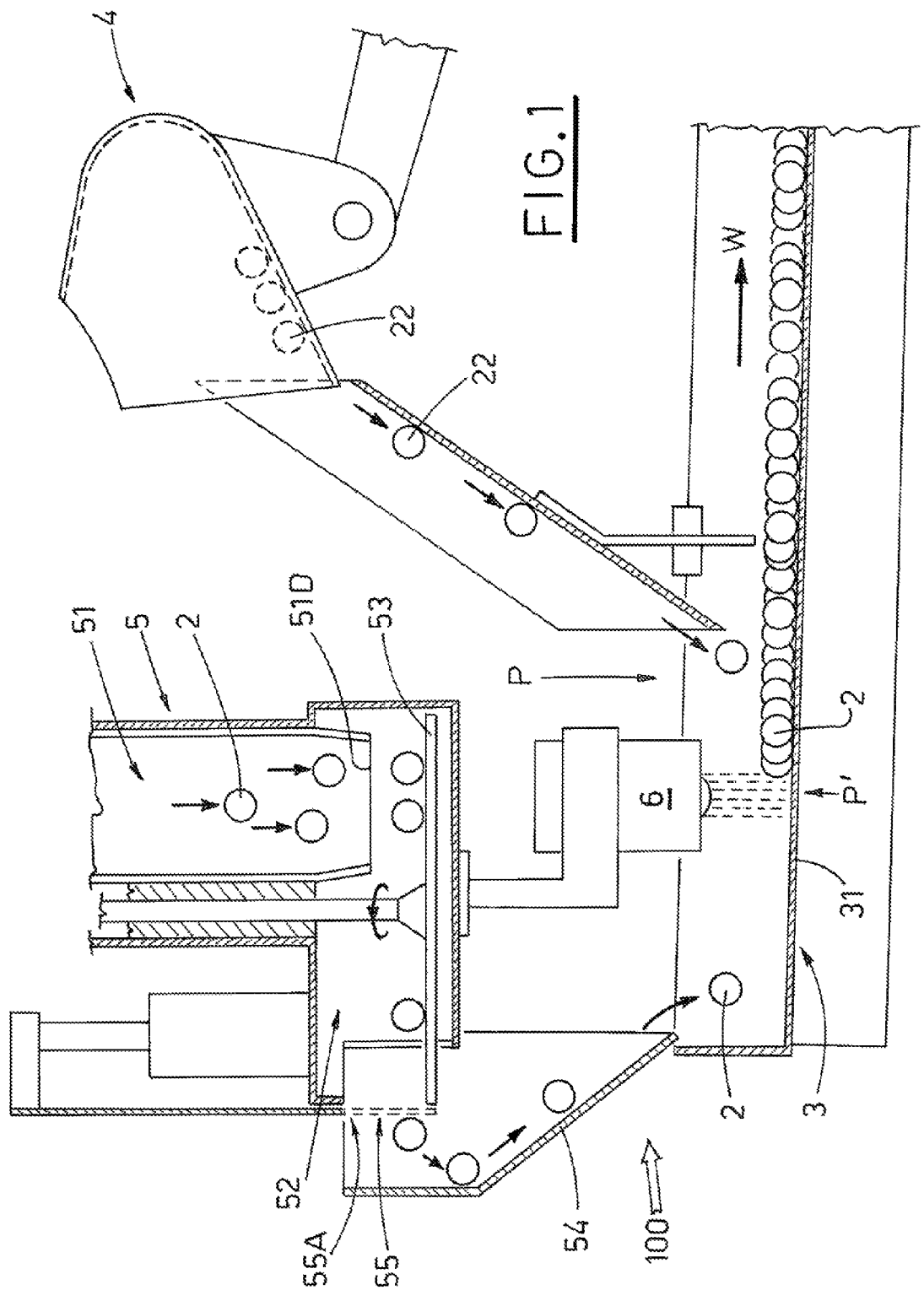
FIG. 1 schematically illustrates a lateral view of a preferred embodiment of the station.

With reference to FIG. 1, 100 denotes the supply station of articles 2, 22 to a plurality of channels (for reasons of simplicity not illustrated in the figures of the drawings) opening above a continuous blister strip (also not illustrated).

The articles 2, 22 are preferably constituted by pills (or capsules, lozenges and the like) which are to be directed towards mouths of supply channels of the underlying continuous blister strip from which blister packs are to be created.

In a known way, the station 100 comprises supply organs (not illustrated and for example constituted by a hopper installed downstream of a storehouse) which contain the articles 2 and dispense them towards conveying means 3 provided downstream. The conveying means 3 are for example constituted by a vibrating linear conveyor 31 which is inclined towards upper mouths of the supply channels. The linear conveyor 31 orders and transfers, in an advancement direction W, the articles 2 towards the mouths of the supply channels.

Known collecting means and transfer means 4 (illustrated in FIGS. 3a and 3b, see for example EP 1,325,877 and EP 1,547,946, FIGS. 3a and 3b corresponding to FIGS. 1 and 2 thereof), positioned in proximity of the mouths M, receive and collect the excess articles 22 which accumulate at the mouths and transfer them upstream, in proximity of a predetermined first zone P of the linear conveyor 31.

Directing organs 5, interposed between the hopper and the linear conveyor 31, release the articles 2 onto the conveyor 31 in proximity of the first zone P.

Detecting and control organs 6, situated in a second zone P' of the linear conveyor 31 adjacent to the first zone P, detect the presence or absence of articles 2, 22 in the second zone P' in order to at least temporarily interrupt the directing organs 5 (with a consequent temporary interruption of the release of the articles 2 by the directing organs 5) according to the quantity of articles 2, 22 present in the second zone P', in order to prevent an excess of the articles 2, 22 on the conveying means 3.

In a preferred configuration of the station 100, the first zone P is downstream of the second zone P' and the directing organs 5, 50 release the articles 2 upstream thereof.

In a further configuration, the first P and the second P' zones are coincident and further the release of the articles 2 can be performed at the second zone P'.

In particular the directing organs 5 comprise: a first vertical channel 51, a top and bottom end of which 51D are respectively in communication with the hopper and an intermediate chamber 52 laterally provided with an opening 55A; a carousel 53, rotating internally of the intermediate chamber 52 for projecting the articles released thereon towards the opening 55A; channeling organs 54 interposed between the intermediate chamber 52 and the linear conveyor 31 for facilitating ordered flow of the articles 2 towards the linear conveyor 31; a gate 55 (for example manually controlled) for partializing the opening 55A to varying degrees.

The detecting and control organs 6 are preferably constituted by a sensor, situated superiorly of the linear conveyor 31, which commands the temporary interruption of the flow of articles 2 from the storehouse to the intermediate chamber 52.

The sensor further commands a temporary interruption of the rotation of the carousel 53.

The operating modes of the station 100 will now be briefly described, as they are already easily deduced from the foregoing.

Starting from an initial configuration in which the directing organs 5 are releasing the articles 2 on the linear conveyor 31 upstream of the second zone P' and the collecting means are collecting the excess articles 22, when the excess articles 22 reach a predetermined quantity, they are transferred (by the transfer means 4) in proximity of the first zone P on the linear conveyor 31. The articles 2, 22 are distributed on the conveyor 31 both upstream and downstream, with a consequent increase in the quantity thereof at the second zone P'; the sensor detects this increase and, with the aim of preventing an excess of the articles 2, 22 on the linear conveyor 31, temporarily interrupts the release thereon of the articles 2 coming from the storehouse, according to the quantity of articles 2, 22 present in the second zone P'. The temporary interruption is imposed by the sensor which commands the temporary interruption of the rotation of the carousel 53.

The movement (by the conveyor 31) of the articles 2, 22 towards the channel mouths determines a progressive reduction in the number of articles 2, 22 in the second zone P'. In this situation, in order not to interrupt the supply to the channels, release of the articles 2 onto the conveyor 31 is reactivated (with the articles coming from the storehouse): the sensor, detecting this reduction, commands (possibly with a predetermined delay) the rotation of the carousel 53. At this point the operating stages are cyclically recommenced, as described above.

From the above it can be understood that the station 100 advantageously ensures an optimal confluence of the articles 22 coming from the collection and transfer means 4 and the articles 2 coming from the storehouse.

To this can be added the fact that the station 100, being actuated via a technical solution of simple conception, ensures high standards of reliability and productivity under all working conditions; this means easy and rapid installation and maintenance operations of the station.

Figure 2:
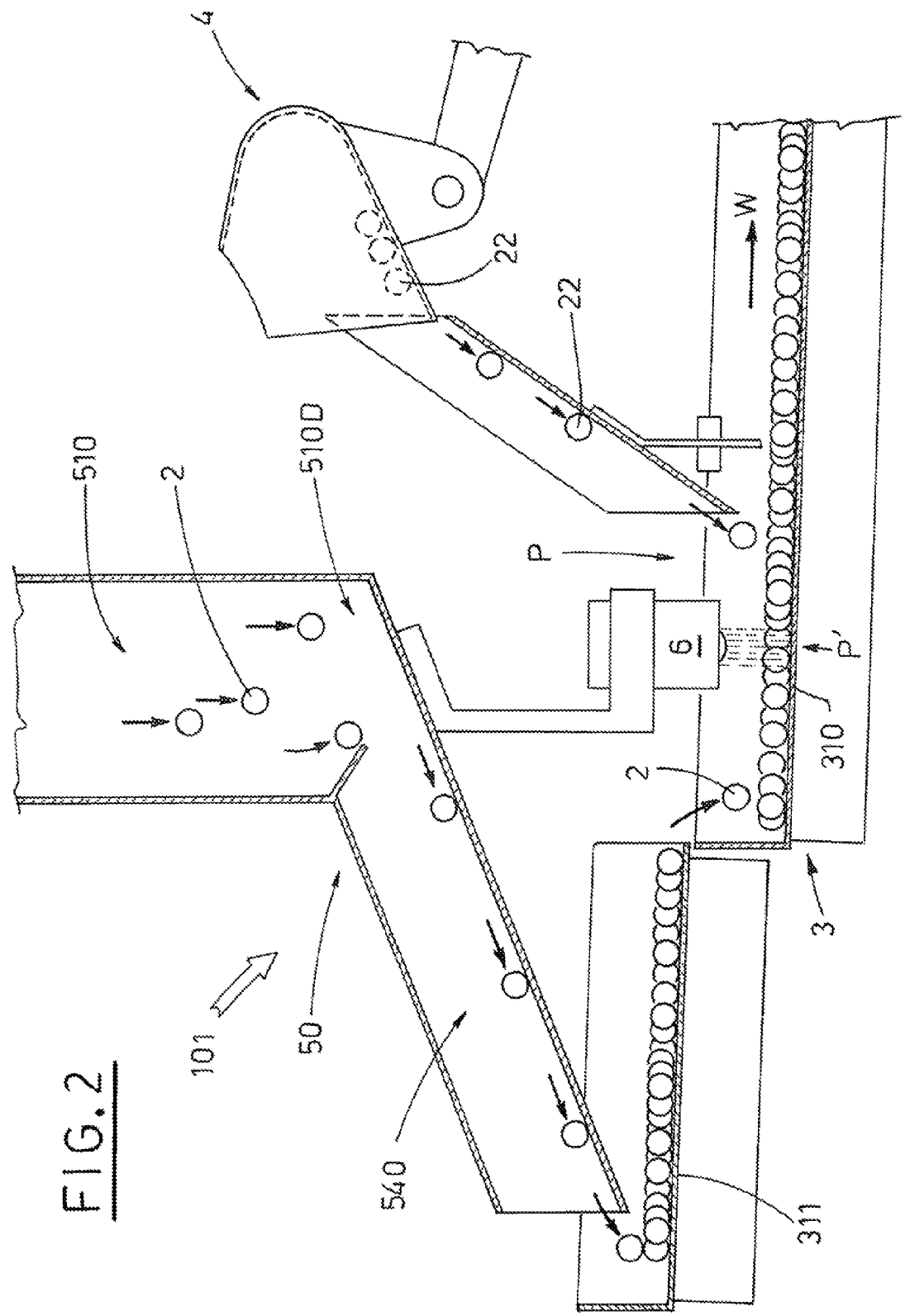
FIG. 2 is a schematic illustration of an additional embodiment of the station; and, FIGS. 3a and 3b are prior art illustrations of collection and transfer means taken from EP 1,547,946/U.S. Pat. No. 7,222,717, FIGS. 1 and 2.
Figure 3A:
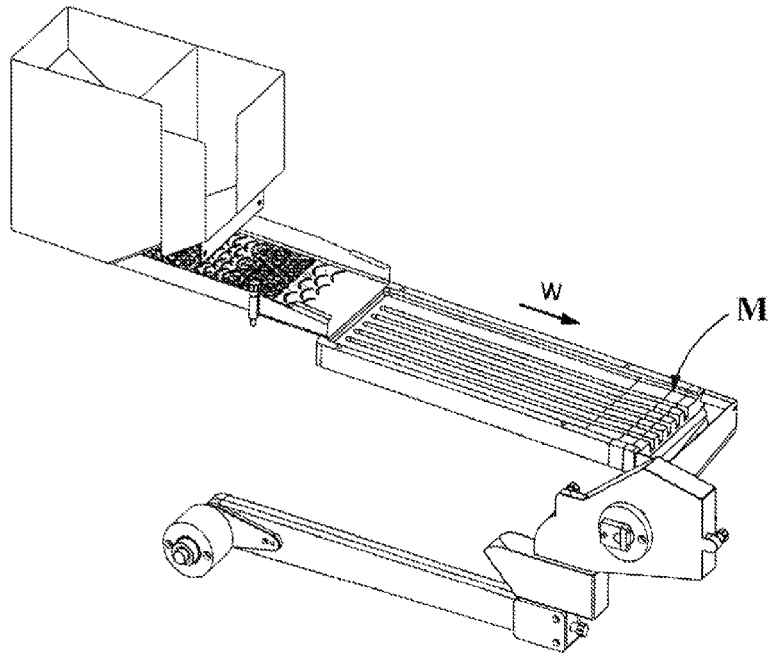
Figure 3B:
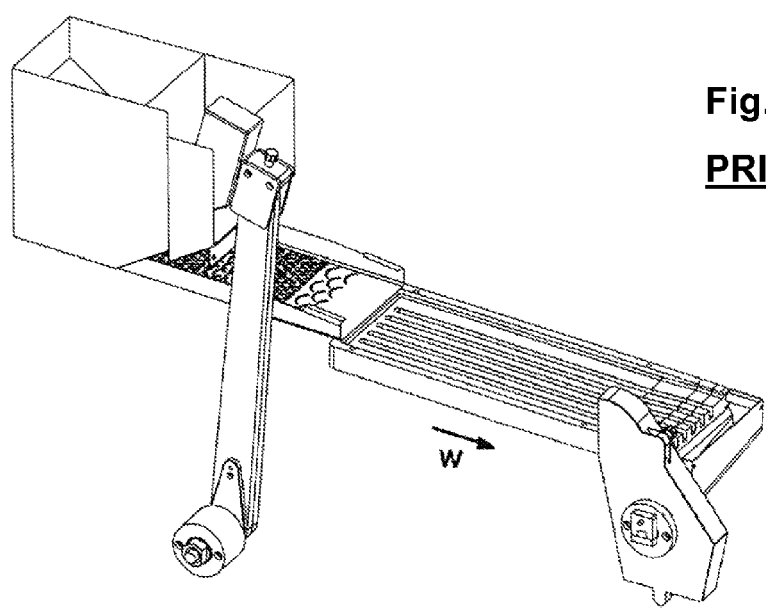

In FIG. 2 the number 101 denotes an alternative embodiment of the station for supplying the articles 2, 22 to the plurality of channels opening superiorly of the continuous blister strip.

In particular, in this embodiment the directing organs 50 comprise a second vertical channel 510 having the upper end and the lower end 510D thereof respectively communicating with the hopper and with a channel 540 inclined downwards (in the illustrated case oriented upstream) in order to facilitate ordered release of the articles 2 onto a linear conveyor 311 which in turn moves them in a direction W towards a second conveyor 310.

The detecting and control organs 6, as previously mentioned, are constituted by a sensor, situated superiorly of the second conveyor 310, which commands the deactivation of the conveyor 311, or commands the at least temporary interruption of the flow of the articles 2 along the second vertical channel 510, consequently interrupting the release of the articles 2 onto the linear conveyor 311.

The invention has obviously been described with reference to the appended figures of the drawings, purely by way of a non-limiting example, and it is therefore obvious that all modifications or variations can be brought thereto which are comprised in the ambit defined by the following claims.

What is claimed:

1. A supply station for supplying articles to a plurality of channels opening above a blister strip, the supply station receiving both articles and returned excess articles for supply to the plurality of channels, the supply station having:

supply organs for containing the articles and for dispensing the articles towards conveying means located downstream, which conveying means select and direct the articles in an ordered fashion in an advancement direction towards mouths of the plurality of channels;

collecting and transfer means, functionally associated with the channel mouths for receiving and collecting excess articles which accumulate at the mouths, and transferring the excess articles to a transfer means located upstream of the mouths, in proximity to a predetermined first zone of the conveying means, for supplying the excess articles thereto;

the supply station further comprising:

directing organs interposed between the supply organs and the conveying means to release the articles onto the conveying means, in proximity to the first zone;

detecting and control organs for detecting a presence or absence of articles and/or excess articles on at least a second zone of the conveying means adjacent to the first zone and for at least temporarily inhibiting the directing organs to cause at least a temporary interruption of release of the articles by the directing organs in relation to a quantity of articles and/or excess articles present in the second zone, in order to prevent an excessive accumulation of the articles and/or the excess articles on the conveying means wherein the first zone is downstream of the second zone, and wherein the directing organs release the articles upstream of the second zone, the directing organs comprising a first vertical channel having relative top and bottom ends respectively communicating with the supply organs and with an intermediate chamber provided laterally with an opening; and, a carousel, rotating internally of the intermediate chamber, for projecting the articles towards the opening.

2. The station of claim 1 wherein the directing organs comprise channeling organs interposed between the intermediate chamber and the conveying means, so as to facilitate an ordered flow of the articles towards the conveying means.

3. The station of claim 2, wherein the directing organs have a gate for closing off the opening to varying degrees in order to interrupt flow of the articles towards the conveying means.

4. The station of claim 1 wherein the detecting and control means include a sensor, situated superiorly of the conveying means capable of commanding at least a temporary interruption of the flow of the articles from the supply means to the intermediate chamber.

5. The station of claim 4, characterized in that the sensor is capable of commanding at least a temporary interruption of rotation of the carousel.

6. The station of claim 3, characterized in that the gate is manually operated.

7. The station of claim 1, characterized in that the conveying means are constituted by at least a vibrating conveyor.

8. The station of claim 1, characterized in that the first zone and the second zone are coincident.

9. The station of claim 1, characterized in that the directing organs release the articles in the second zone.

10. A supply station for supplying articles to a plurality of channels opening above a blister strip, the supply station receiving both articles and returned excess articles for supply to the plurality of channels, the supply station having:

supply organs for containing the articles and for dispensing the articles towards conveying means located downstream, which conveying means select and direct the articles in an ordered fashion in an advancement direction towards mouths of the plurality of channels;

collecting and transfer means, functionally associated with the channel mouths for receiving and collecting excess articles which accumulate at the mouths, and transferring the excess articles to a transfer means located upstream of the mouths, in proximity to a predetermined first zone of the conveying means, for supplying the excess articles thereto;

the supply station further comprising:

directing organs interposed between the supply organs and the conveying means to release the articles onto the conveying means, in proximity to the first zone;

detecting and control organs for detecting a presence or absence of articles and/or excess articles on at least a second zone of the conveying means adjacent to the first zone and for at least temporarily inhibiting the directing organs to cause at least a temporary interruption of release of the articles by the directing organs in relation to a quantity of articles and/or excess articles present in the second zone, in order to prevent an excessive accumulation of the articles and/or the excess articles on the conveying means wherein the first zone is downstream of the second zone, and wherein the directing organs release the articles upstream of the second zone; and, further comprising a second vertical channel having a top and a bottom end which respectively communicate with the supply organs and with a channel which is inclined downwards to facilitate ordered release of the articles onto the conveying means.

11. The station of claim 10, wherein the detecting and control organs include a sensor, situated superiorly of the conveying means capable of commanding at least a temporary interruption of the flow of the articles along the second vertical channel.

* * * * *